US012698959B2

(12) United States Patent
Yu

(10) Patent No.: US 12,698,959 B2
(45) Date of Patent: Aug. 4, 2026

(54) ABSOLUTE MEASUREMENT METHOD FOR THE PHASE OF THE COMPLEX COHERENCE COEFFICIENT

(71) Applicant: Shanghai Institute of Technical Physics, Chinese Academy of Sciences, Shanghai (CN)

(72) Inventor: Qinghua Yu, Shanghai (CN)

(73) Assignee: Shanghai Institute of Technical Physics, Chinese Academy of Sciences, Shanghai (CN)

( * ) Notice: Subject to any disclaimer, the term of this patent is extended or adjusted under 35 U.S.C. 154(b) by 126 days.

(21) Appl. No.: 18/665,484

(22) Filed: May 15, 2024

(65) Prior Publication Data

US 2024/0401927 A1 Dec. 5, 2024

(30) Foreign Application Priority Data

Jun. 5, 2023 (CN) .......................... 202310655489.5

(51) Int. Cl.
    *G01B 9/02* (2022.01)
    *G01B 9/02055* (2022.01)
    (Continued)

(52) U.S. Cl.
    CPC ..... *G01B 9/02091* (2013.01); *G01B 9/02043* (2013.01); *G01B 9/02057* (2013.01); *G01B 9/02067* (2013.01)

(58) Field of Classification Search
    CPC ............ G01B 9/02091; G01B 9/02043; G01B 9/02057; G01B 9/02067; G01B 9/02083;
    (Continued)

(56) References Cited

U.S. PATENT DOCUMENTS 4,505,588 A * 3/1985 Ludman ............. G01B 9/02063
                                              250/227.12
4,558,951 A * 12/1985 Ludman ................. G01J 3/453
                                              356/477
(Continued)

FOREIGN PATENT DOCUMENTS

CN        116380261 A      7/2023

OTHER PUBLICATIONS

Creath, Katherine, "Error sources in phase-measuring interferometry (Invited Paper)," Proc. SPIE 1720, Intl Symp on Optical Fabrication, Testing, and Surface Evaluation, vol. 1720, pp. 428-435 (Oct. 1992).

(Continued)

*Primary Examiner* — Jonathan M Hansen
(74) *Attorney, Agent, or Firm* — Mei & Mark LLP; Manni Li

(57) ABSTRACT
A method for absolute phase measurement for complex coherence coefficient of an object comprises: firstly, processing fringe data measured by interferometry on any aperture pairs of an equivalent pupil plane of an optical imaging system to obtain an interference term and envelope and extreme values thereof; secondly, selecting extreme value A of light intensity from an interval of relatively stable extreme values change on one side of a curve envelope with zero optical path difference, and selecting two extreme values B and C of light intensity closest to extreme value A on other side of the curve envelope with zero optical path difference, where B>A≥C or C>A≥B; thirdly, counting number of fringe periods between A and C or A and B; and fourthly, according to the number of fringe periods, selecting a formula to calculate absolute phase of complex coherence coefficient of the object.

2 Claims, 5 Drawing Sheets

(51) Int. Cl.
    G01B 9/02056 (2022.01)
    G01B 9/02091 (2022.01)
(58) Field of Classification Search
    CPC ................ G01J 9/02; G01J 2009/0211; G01J
    2009/0226
    See application file for complete search history.

(56) References Cited

U.S. PATENT DOCUMENTS

| 4,747,688 | A | * | 5/1988 | Geary | ....................... | G01J 9/02 |
| | | | | | | 356/477 |
| 7,154,608 | B1 | * | 12/2006 | Glassman | ................. | G02F 1/39 |
| | | | | | | 356/450 |
| 2019/0271534 | A1 | * | 9/2019 | Farah | ................. | G01B 9/02084 |

OTHER PUBLICATIONS

Chen, Jialiang et al., "Influence of measurement errors of the complex coherence factor on reconstructed image quality of integrated optical interferometric imagers," Optical Engineering, vol. 61(10), pp. 105108 1-12 (Oct. 2022).

Thiébaut, Éric et al., "Principles of image reconstruction in optical interferometry: tutorial," Journal of the Optical Society of America A, vol. 34, No. 6, pp. 904-923 (Jun. 2017).

* cited by examiner

Optical path difference/micron

Optical path difference corresponding to the
relative maximum value A/micron

Optical path difference/micron

Optical path difference corresponding to the
relative maximum value A/micron

ABSOLUTE MEASUREMENT METHOD FOR THE PHASE OF THE COMPLEX COHERENCE COEFFICIENT

CROSS-REFERENCE TO RELATED APPLICATIONS

The subject application claims priority on Chinese patent application no. 202310655489.5 filed on Jun. 5, 2023, in China. The contents and subject matters of the Chinese priority applications are incorporated herein by reference.

TECHNICAL FIELD

The present invention belongs to the field of photoelectric imaging and provides an absolute measurement method for the phase of the complex coherence coefficient of object in optical pupil-plane interferometry for imaging technology.

BACKGROUND

The technology of computational imaging through optical pupil plane interference has obvious technical advantages in the field of high-resolution imaging, and a strong equivalent aperture expansion capability. The theory of computational imaging through optical pupil plane interference is van Cittert-Zernike Theorem. In the theory, an object complex coherence coefficient $\mu(u, v)$ for an equivalent pupil plane of an optical system is the normalized Fourier transform of an incoherent extended light source distribution $I(\xi, \eta)$, where $(u, v)$ represents spatial spectrum coordinates and $(\xi, \eta)$ represents extended light source space coordinates. When the object complex coherence coefficient $\mu(u, v)$ can be measured, a Fourier spectrum of the light source is obtained, and a light source intensity distribution $I(\xi, \eta)$ can be obtained according to an inverse Fourier transform. The object complex coherence coefficient $\mu(u, v)$ includes a modulus $|\mu|$ and a phase $\phi$ (also known as an argument angle), which can be expressed as $\mu=|\mu|e^{j\phi}$. In theory, $\mu(u, v)$ can be determined by assessing the visibility of interference between baseline aperture pairs and a phase difference at a position of zero optical path.

Based on the imaging theory, numerous large-scale interferometers have been developed and set up internationally. Ground-based large optical interferometers currently in operation include the European Southern Observatory's Very Large Telescope (VLTI) with a maximum baseline length of 200 m, the Navy Precision Optical Interferometer (NPOI) with a baseline length of 10-432 m, and the Center for High Angular Resolution Astronomy (CHARA) with a baseline length of 34-331 m. Referring to the technology of ground-based astronomical interferometers, the National Aeronautics and Space Administration (NASA) and European Space Agency (ESA) have taken the lead in launching the free-flyer interferometer project. The Space Interferometry Mission (SIM), as originally planned, is the first space long-baseline optical interferometer used for astronomical observations, whose precision in celestial measurement is estimated to be much higher than that of any other project currently existing or under development. The research in this field has continued for many years, but SIM has been canceled, which leads to many uncertainties in the research and development of large space interferometers.

One of the engineering application problems of existing large long-baseline interferometers is the difficulty in measuring the phases of complex coherence coefficients. Astronomical interferometers commonly use channeled spectrum for phase measurement. The method uses a channeled spectrum to disperse broadband optical signals, records them with an imaging detector, and determines the position of a zero optical path difference by observing the number of fringes at various optical path differences, so as to achieve the phase measurement of the complex coherence coefficient. However, in a complex space environment, on a scale of ten meters, tens of meters, or even hundreds of meters, a truss might be deformed due to influencing factors such as vibration, heat, and gravity gradients, so that the pre-calibrated position of the zero optical path difference might drift and get dislocated. Therefore, an interferometer in the operating state needs to be calibrated repeatedly according to a reference target. In addition to the channeled spectrum method, a closure phase measurement method is commonly used in the field of astronomical interference. Specifically, three sets of relative phases are obtained by pairing three apertures in pairs. In theory, the closure phase measurement method can eliminate the influence of atmospheric turbulence, but the number of closure phases is always smaller than the number of true phases, so a specific algorithm needs to be designed to solve the number of true phases of the complex coherence coefficient. When the phases of the complex coherence coefficient cannot be measured, scientists, through iterative optimization of algorithm, try to recover the phases of the complex coherence coefficients, so as to further complete the reconstruction of high-resolution images.

SUMMARY OF THE INVENTION

In order to solve the problem of measuring the phases of the complex coherence coefficients in the computational imaging system through optical pupil plane interference and facilitate the engineering application of the imaging system, the present invention provides a method for measuring the absolute values of the phases of the complex coherence coefficients by comparing extreme values of interferometry fringe curve on both sides of an interference envelope. The method of the present invention is simple in principle and robust against external environmental factors, making it widely applicable. Compared with a relative measurement method for the phases of the complex coherence coefficients in Chinese invention patent application No. CN2023103687876, the method of the present invention is simpler to implement and more efficient in measurement.

According to the richer connotation of the Van Cittert-Zernike Theorem, a function of mutual interference between optical signals received by two endpoints $P_1$ and $P_2$ of any baseline on an equivalent pupil plane of an optical system can be described by use of the following formula:

$$\Gamma(P_1, P_2, \tau) = \sqrt{I(P_1)} \sqrt{I(P_2)} \gamma(P_1, P_2, \tau) = \tag{1}$$

$$\int_0^\infty e^{-2\pi i \nu \tau} d\nu \int\int_D I(\alpha, \beta, \nu) \frac{e^{ik(R_1 - R_2)}}{R_1 R_2} d\alpha d\beta,$$

where $$I(P_1) = \Gamma(P_1, P_1, 0) = \int_0^\infty d\nu \int\int_D \frac{I(\alpha, \beta, \nu)}{R_1^2} d\alpha d\beta, \tag{2}$$

$$I(P_2) = \Gamma(P_2, P_2, 0) = \int_0^\infty d\nu \int\int_D \frac{I(\alpha, \beta, \nu)}{R_2^2} d\alpha d\beta. \tag{3}$$

$I(P_1)$ and $I(P_2)$ and are light intensities of the light signals received at $P_1$ and $P_2$ respectively, $\gamma(P_1, P_2, \tau)$ is a complex coherence degree of the light signals received by $P_1$ and $P_2$ at time delay $\tau$, $I(\alpha, \beta, v)$ is a light intensity per unit area of an extended light source of an object plane $(\alpha, \beta)$ at a frequency band $$\left(v_0 - \frac{\Delta v}{2}, v_0 + \frac{\Delta v}{2}\right),$$

and $R_1$ and $R_2$ are distances from the light source $I(\alpha, \beta, v)$ to $P_1$ and $P_2$ respectively.

When $\tau=0$, the complex coherence degree of the optical signals received at $P_1$ and $P_2$ can be obtained according to the formula (1):

$$\gamma(P_1, P_2, 0) = \frac{\int_0^\infty dv \iint_D I(\alpha, \beta, v) \frac{e^{ik(R_1-R_2)}}{R_1 R_2} d\alpha d\beta}{\sqrt{I(P_1)}\sqrt{I(P_2)}} = \qquad (4)$$

$$\frac{\int_0^\infty dv \iint_D I(\alpha, \beta, v) e^{ik(R_1-R_2)} d\alpha d\beta}{\int_0^\infty dv \iint_D I(\alpha, \beta, v) d\alpha d\beta}.$$

Assuming that in a narrowband $$\left(v_0 - \frac{\Delta v}{2}, v_0 + \frac{\Delta v}{2}\right),$$

a light source intensity $I(\alpha, \beta, v)$ of each frequency for a same panel in a light source area D is the same, the complex coherence degree can be expressed by using a modulus G and a phase $\varphi$ (also known as an argument angle) of a complex coherence coefficient $\mu(u, v)$, that is, $$\gamma(P_1, P_2, 0) = \mu(P_1, P_2) = |\mu|e^{i\varphi}. \qquad (5)$$

After the formula (5) is substituted into the formula (1), under the condition that a spectral response function $T(v)$ of an imaging system is taken into account, the complex coherence degree of the optical signals after being transmitted and interfered by means of a coupler can be obtained:

$$\gamma(P_1', P_2', \tau) = \mu(P_1, P_2)\frac{\int_0^\infty T(v)e^{-2\pi i v\tau} dv}{\int_0^\infty T(v) dv} = |\mu|\frac{\int_0^\infty T(v)e^{i\varphi - 2\pi i v\tau} dv}{\int_0^\infty T(v) dv}. \qquad (6)$$

Assuming that total dispersion of the optical signals during transmission in all media is 0, then $$\gamma(P_1', P_2', \tau) = \frac{|\mu||F(\tau)|e^{i[\varphi - 2\pi v_0 \tau + f(\tau)]}}{F_0}, \qquad (7)$$

where $F(\tau)$ is a Fourier transform of the function $T(v)$, $F(\tau)=|F(\tau)|e^{if(\tau)}$; and $f(\tau)$ is a phase term related to a spectral shape, and in particular, when $T(v)$ is symmetric about a central frequency $v_0$, $F(\tau)$ is a real function, and $f(\tau)=0$ or $\pi$.

$$F_0 = \int_0^\infty T(v) dv,$$

$F_0$ can be regarded as a constant.

Therefore, for the light signals received through corresponding apertures of the two endpoints $P_1$ and $P_2$ of any baseline on an equivalent pupil plane of an optical system, the interference fringes generated by the coupler can be expressed as:

$$\begin{aligned} I_{tot}(\tau) = \\ I(P_1)' + I(P_2)' + \frac{2\sqrt{I(P_1)'}\sqrt{I(P_2)'}|\mu|}{F_0}|F(\tau)|\cos(\varphi - 2\pi v_0 \tau + f(\tau)), \end{aligned} \qquad (8)$$

where $I(P_1)'$ and $I(P_2)'$ represent light intensities of the light signals received at $P_1$ and $P_2$ respectively after passing through the spectral channel of the imaging system.

$$I_\Delta(\tau) = \frac{I_{tot}(\tau) - I(P_1)' - I(P_2)'}{2\sqrt{I(P_1)'}\sqrt{I(P_2)'}} = \frac{|\mu|}{F_0}|F(\tau)|\cos(\varphi - 2\pi v_0 \tau + f(\tau))$$

is an interference term, $$\frac{|\mu|}{F_0}$$

is a constant, and when $$\frac{|\mu|}{F_0} = 1,$$

$|F(\tau)|$ can be regarded as an envelope function of the interference fringes. When $$\tau = \frac{\varphi + 2n\pi + f(\tau)}{2\pi v},$$

$I_\Delta(\tau)$ is a relative maximum value $(n \in N)$, and when $$\tau = \frac{\varphi + (2n+1)\pi + f(\tau)}{2\pi v},$$

$I_\Delta(\tau)$ is a relative minimum value.

Assuming that $T(v)$ is symmetric about the central frequency $v_0$, and is in a main lobe containing the position of the zero optical path difference, then $f(\tau)=0$. For an light signal of an object with a phase of $\phi$, when $\tau$ is located in an interval where a first-order derivative $|F(\tau)|'=k$ of $|F(\tau)|$ remains approximately unchanged, and a second-order derivative approaches zero, a relative maximum value $$a_{-n}^{\phi} = I_{\Delta}\left(\frac{\phi - 2n\pi}{2\pi v}\right)$$

(n is an integer) of light intensity in an interval where the extreme values change of the interference signal in the main lobe on one side of the zero optical path of the interference signal is relatively stable is extracted.

When $0 \leq \phi < \pi$, in the main lobe on the other side of the zero optical path difference, extreme values of light intensity closest to the relative maximum value $$a_{-n}^{\phi}$$

are $$a_n^{\phi} = I_{\Delta}\left(\frac{2n\pi + \phi}{2\pi v}\right) \text{ and } a_{n-1}^{\phi} = I_{\Delta}\left(\frac{2(n-1)\pi + \phi}{2\pi v}\right),$$

and $$a_{n-1}^{\phi} > a_{-n}^{\phi} \geq a_n^{\phi},$$

and in this case, there are an even number of fringe periods between $$a_{-n}^{\phi} \text{ and } a_n^{\phi}.$$

The phase $\phi$ of a measured signal satisfies the following conditions:

$$Rmax_n^{\phi} = \frac{a_{-n}^{\phi} - a_n^{\phi}}{a_{n-1}^{\phi} - a_n^{\phi}} = \frac{\left|F\left(\frac{2n\pi - \phi}{2\pi v}\right)\right| - \left|F\left(\frac{2n\pi - \phi}{2\pi v}\right)\right|}{\left|F\left(\frac{2(n-1)\pi + \phi}{2\pi v}\right)\right| - \left|F\left(\frac{2n\pi + \phi}{2\pi v}\right)\right|} \approx \frac{k\frac{2\phi}{2\pi v}}{k\frac{2\pi}{2\pi v}} = \frac{\phi}{\pi}. \quad (9)$$

When $\pi \leq \phi < 2\pi$, in the main lobe on the other side of the zero optical path difference, extreme values of light intensity closest to the relative maximum value $$a_{-n}^{\phi}$$

are $$a_{n-1}^{\phi} = I_{\Delta}\left(\frac{2(n-1)\pi + \phi}{2\pi v}\right) \text{ and } a_{n-2}^{\phi} = I_{\Delta}\left(\frac{2(n-2)\pi + \phi}{2\pi v}\right),$$

and $$a_{n-2}^{\phi} > a_{-n}^{\phi} \geq a_{n-1}^{\phi},$$

and in this case, there are an odd number of fringe periods between $$a_{-n}^{\phi} \text{ and } a_{n-1}^{\phi}.$$

The phase $\phi$ of a measured signal satisfies the following conditions:

$$Rmax_n^{\phi} = \frac{a_{-n}^{\phi} - a_{n-1}^{\phi}}{a_{n-2}^{\phi} - a_{n-1}^{\phi}} = \quad (10)$$

$$\frac{\left|F\left(\frac{2n\pi - \phi}{2\pi v}\right)\right| - \left|F\left(\frac{2(n-1)\pi + \phi}{2\pi v}\right)\right|}{\left|F\left(\frac{2(n-2)\pi + \phi}{2\pi v}\right)\right| - \left|F\left(\frac{2(n-1)\pi + \phi}{2\pi v}\right)\right|} \approx \frac{k\frac{2\phi - 2\pi}{2\pi v}}{k\frac{2\pi}{2\pi v}} = \frac{\phi - \pi}{\pi}.$$

To sum up, to calculate the phase $\phi$ of the complex coherence coefficient corresponding to the interference curve, it is only necessary to accurately measure one point of relative maximum or relative minimum light intensity on one side of the zero optical path difference, and two closest points of extreme light intensity on the other side thereof. By comparing the extreme values and counting the number of fringe periods between them, the phase of the interference signal can be calculated. The steps for the absolute measurement method for the phase of the complex coherence coefficient are summarized as follows:

S1: for the optical signals received through corresponding apertures of the two end points $P_1$ and $P_2$ of any baseline on an equivalent pupil plane of an optical system, obtaining interference fringes curve through interference coupling, while controlling the optical fiber retarder to sweep through the position of the zero optical path difference of two optical paths through a computer;

S2: performing direct current (DC) removal, denoising and other operations on the curve of interference fringes to obtain an interference term, as well as its envelope and extreme values;

S3: selecting a relative maximum value A of light intensity from an interval of relatively stable relative maximum values change in the main lobe on one side of the zero optical path of the interference fringes curve, and selecting two extreme values B and C of light intensity that are closest to the relative maximum value A from an interval of relatively stable extreme value change in the main lobe on the other side of the zero optical path, where $B > A \geq C$;

S4: counting the number of fringe periods between A and C;

S5: when the number of fringe periods is an even number, calculating and obtaining an absolute phase $$\phi = \frac{A - C}{B - C}\pi$$

of the measured signal; and

S6: when the number of fringe periods is an odd number, calculating and obtaining an absolute phase $$\phi = \left(1 + \frac{A - C}{B - C}\right)$$

π of the measured signal.

Based on the same principle, an absolute phase of the measured signal can also be calculated and obtained by comparing the relative minimum values in the interference fringes curve.

Specific implementation steps are as follows:

S1: for the optical signals received through corresponding apertures of the two end points $P_1$ and $P_2$ of any baseline on an equivalent pupil plane of an optical system, obtaining interference fringes curve through interference coupling, while controlling the optical fiber retarder to sweep through the position of the zero optical path difference of two optical paths through a computer;

S2: performing DC removal, denoising and other operations on the interference curve to obtain an interference term, as well as its envelope and extreme values;

S3: selecting a relative minimum value A of light intensity from an interval of relatively stable relative minimum values change in the main lobe on one side of the zero optical path of the interference fringes curve, and selecting two extreme values B and C of light intensity that are closest to the relative minimum value A from an interval of relatively stable extreme values change in the main lobe on the other side of the zero optical path, where C>A≥B;

S4: counting the number of fringe periods between A and C;

S5: when the number of fringe periods is an odd number, calculating and obtaining an absolute phase $$\phi = \left| \frac{A-C}{B-C} \right|$$

π of the measured signal;

S6: when the number of fringe periods is an even number, calculating and obtaining an absolute phase $$\phi = \left(1 + \left| \frac{A-C}{B-C} \right| \right)$$

π of the measured signal.

The absolute phase φ is the absolute phase of a complex coherence coefficient of any baseline on an equivalent pupil plane of an optical system.

DETAILED DESCRIPTION OF THE INVENTION AND EMBODIMENTS

The following example shows a phase of a target to be measured in a sub-aperture interference test in the present invention.

Figure 1:
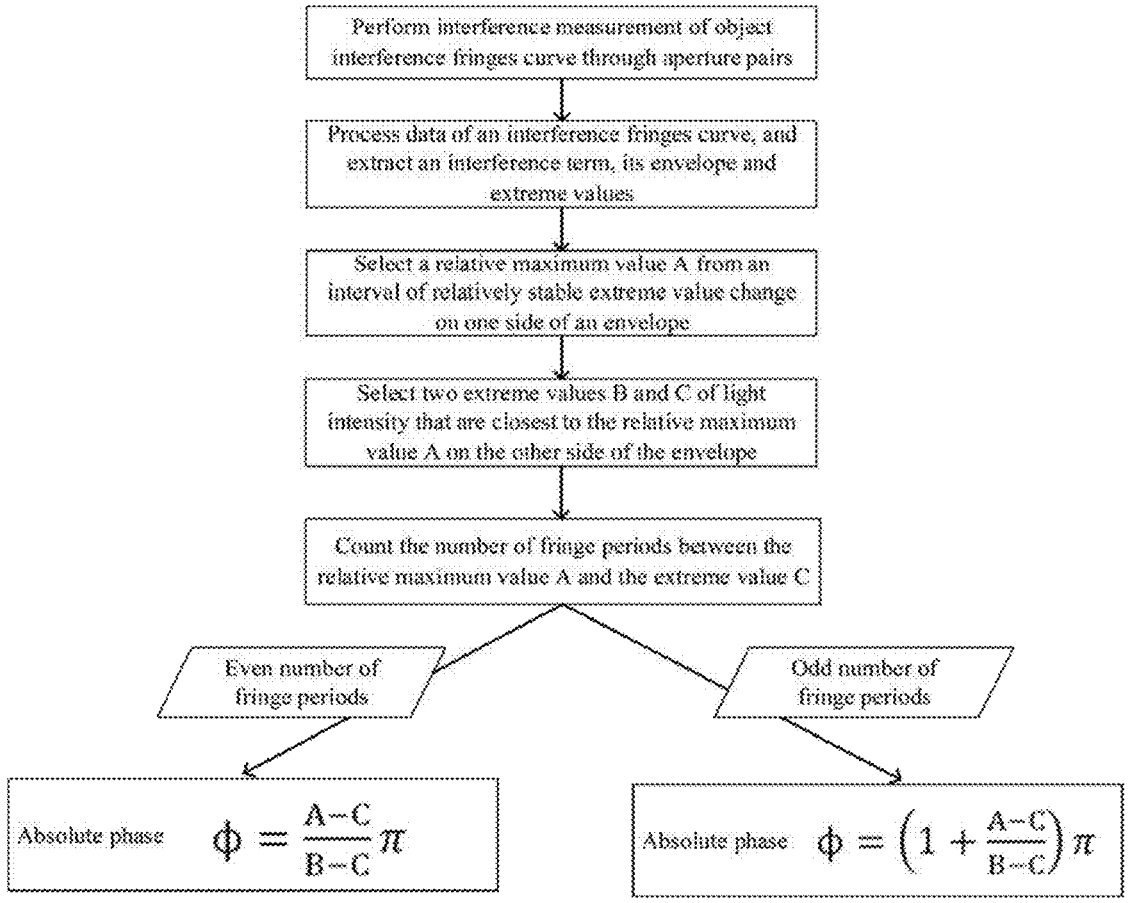
FIG. 1 is a flow chart showing the method for absolute phase measurement of an object complex coherence coefficient in the present invention.
Figure 2:
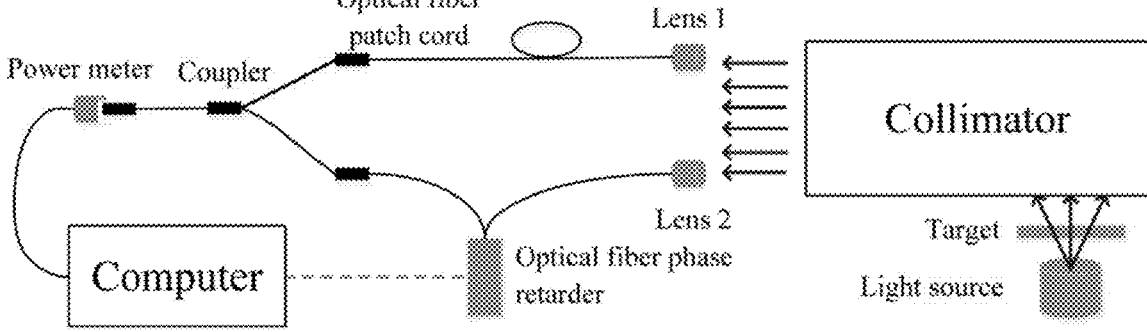
FIG. 2 shows an optical path layout diagram of a target phase to be measured in a sub-aperture interference test in the present invention.
Figure 3:
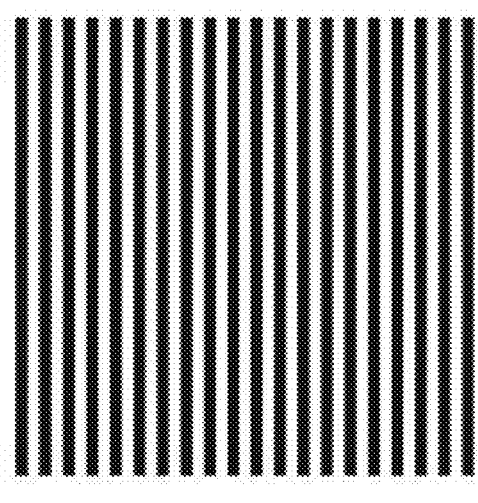
FIG. 3 shows the pattern of a target to be measured in the present invention.

An optical path layout diagram of simulated measurement is shown in FIG. 2. An extended light source enters into a collimator after passing through a target and is output after being collimated. Then, the light source is collected by aperture pairs with a specific spacing, then passes into a 2×1 coupler for interference through optical fiber and an optical fiber retarder, and finally is recorded by an optical power meter. During measurement, the interference signal is collected and recorded while controlling and adjusting the optical fiber retarder through a computer. The target is a black and white periodic fringe pattern with a period of 50 microns, and as shown in FIG. 3, the focal length of the collimator is 2260 mm, and the spacing between centers of the two apertures is 75 mm. Before testing, a position of the target is adjusted to make the apertures symmetrical to a central axis of the pattern in a field of view, and in this case, it is recorded as a zero position of the target. The light source of the target is turned on, and the optical fiber retarder is adjusted, so that it sweeps through the position of the zero optical path difference of two optical paths, and interference data is recorded after measurement. After that, the target is translated every 2.5 microns, and the optical fiber retarder is repeatedly adjusted, so that it sweeps through the position of the zero optical path difference of two optical paths, and interference data is recorded after measurement. The acquired raw data is filtered to remove DC for calculating and obtaining an interference term, and an intensity of the normalized interference term is further obtained.

Figure 4:
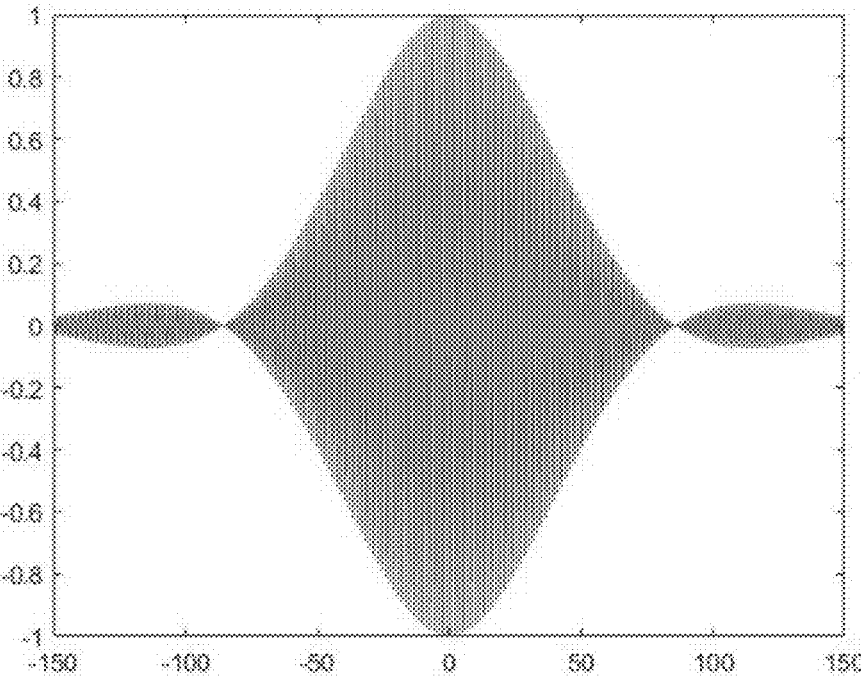
FIG. 4 is an imitated diagram of an interference fringe without an effect of dispersion in the present invention, where the vertical axis represents DC-removed and normalized light intensity.
Figure 5:
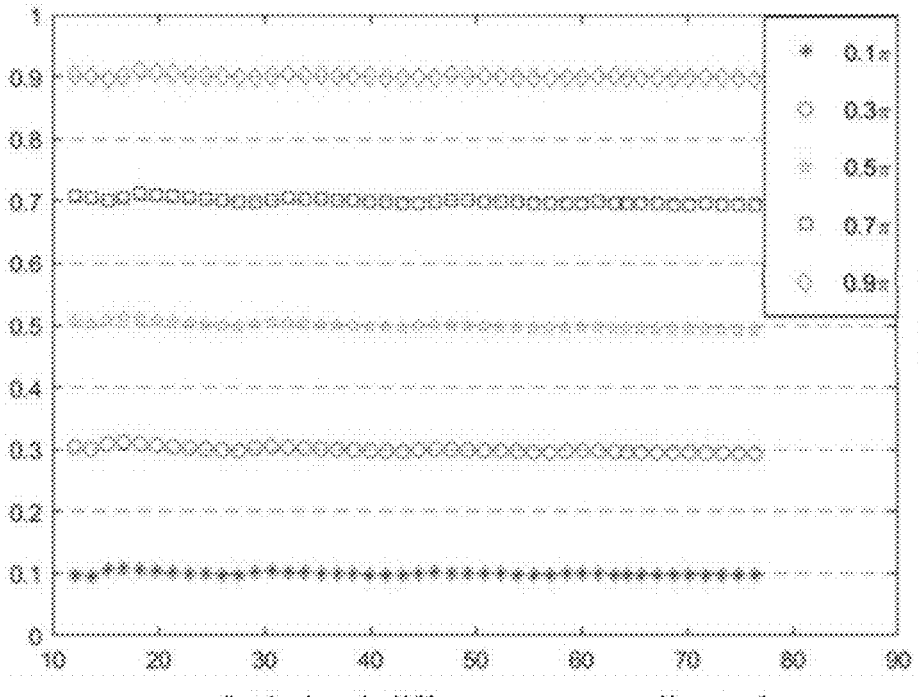
FIG. 5 shows the variation of the phase calculation value of a target to be tested with the position of an extreme value when there is no dispersion effect in the present invention, where the vertical axis represents phase/π.

Assuming that the optical path is not affected by dispersion, an intensity curve of the interference term DC-removed and normalized in a simulation test is shown in FIG. 4. According to a method based on measuring an extreme value of an interference fringe envelope disclosed above, phase values of the target to be measured at positions of 2.5 microns, 7.5 microns, 12.5 microns, 17.5 microns and 22.5 microns are calculated and obtained. Theoretical phase values should be 0.1π, 0.3π, 0.5π, 0.7π and 0.9π respectively. Simulation results show that when the relative maximum value A is located at different positions of the optical path difference, the calculated phase values of the target to be measured are slightly different, as shown in FIG. 5.

Figure 6:
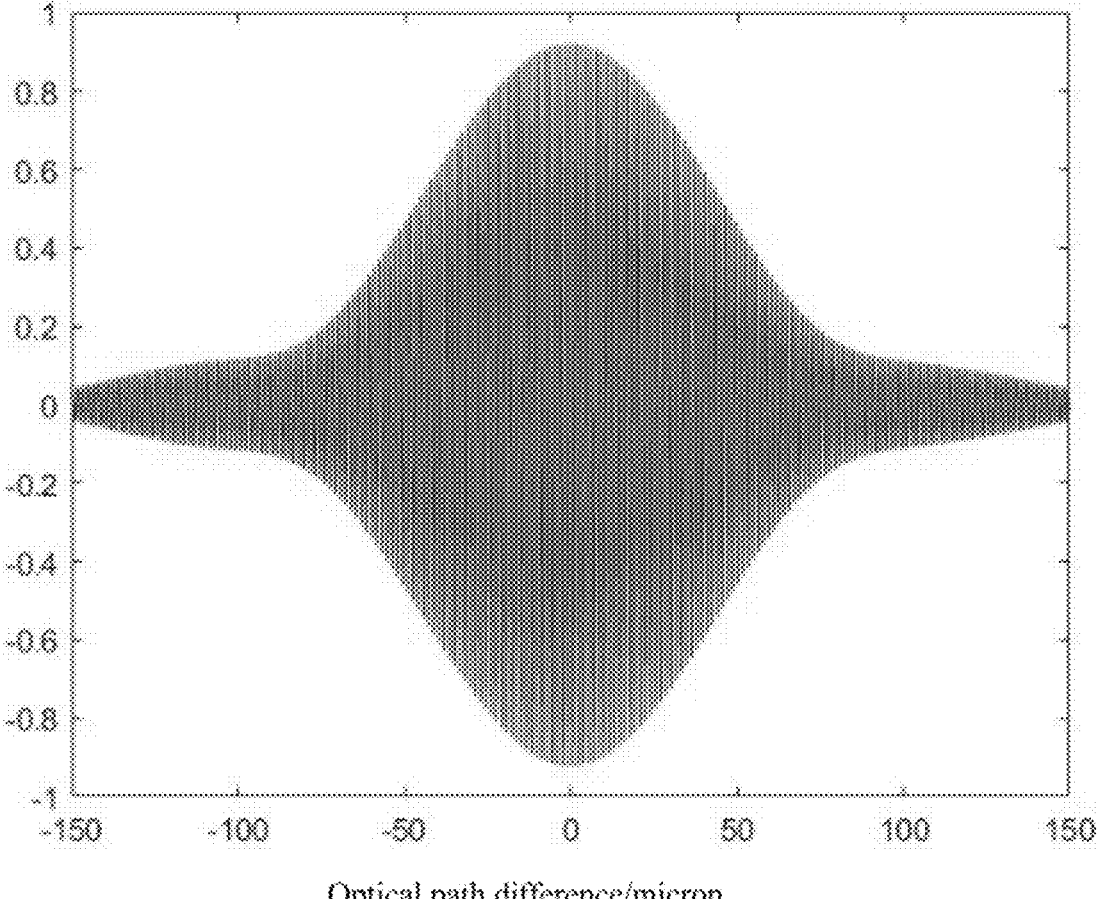
FIG. 6 shows an imitated diagram of an interference fringe with an effect of dispersion in the present invention, where the vertical axis represents DC-removed and normalized light intensity.

Assuming that the optical path is affected by dispersion, a spectral response function is added in the simulation test. The resulting intensity curve of the interference term, DC-removed and normalized, is depicted in FIG. 6. According to the method based on measuring an extreme value of an interference fringe envelope disclosed above, phase values of the target to be measured at positions of 2.5 microns, 7.5 microns, 12.5 microns, 17.5 microns and 22.5 microns are calculated and obtained. Theoretical phase values should be

US 12,698,959 B2

9

Figure 7:
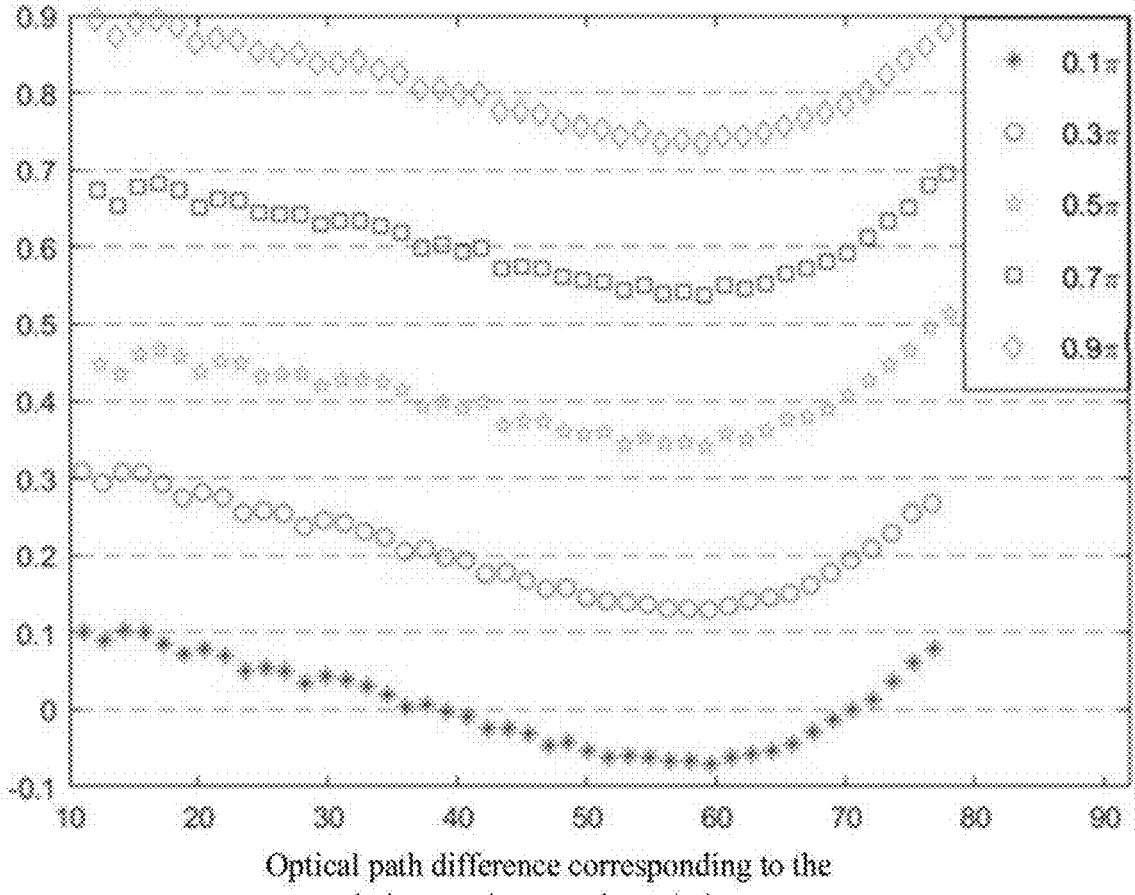
FIG. 7 shows the variation of the phase calculation value of a target to be tested with the position of an extreme value when there is an effect of dispersion, where the vertical axis represents phase/π.

0.1π, 0.3π, 0.5π, 0.7π and 0.9π respectively. Simulation results show that due to the influence of optical path dispersion, the calculated accuracy of the phase value of the target to be measured is related to the position of the relative maximum value A away from the zero optical path difference, that is, it is affected by relative stability of the extreme value change. The phase test accuracy in this case is slightly inferior to the measurement result without dispersion, as shown in FIG. 7. This problem can be solved by calibration before measurement. That is, before measuring a phase of the target to be measured, the phase of a standard target can be measured to determine an extreme value in an optical path difference interval with a small measurement error, thereby guiding the subsequent measurement and data processing of the phase of the target to be measured.

The foregoing is merely a preferred embodiment of the present disclosure and is not intended to limit the patent scope of the present disclosure. Any equivalent method or process transformation derived from the description of the present disclosure and the contents of the accompanying drawings, or directly or indirectly used in other related technical fields are similarly encompassed within the scope of patent protection of the present disclosure.

The method is simple in principle and is not affected by an external environment of an instrument and is widely applied.

What is claimed is:

1. A method for measuring an absolute phase of a complex coherence coefficient of an extended light source based on relative maximum light intensity values, comprising providing an optical system comprising an equivalent pupil plane with a plurality of baselines, wherein each of the baselines comprises a pair of apertures at two end points P1 and P2 on the equivalent pupil plane, emitting optical signals from the extended light source through optical paths to the equivalent pupil plane, wherein the optical signals pass through the pair of the apertures at the two end points P1 and P2 on the equivalent pupil plane, obtaining interference fringes through interference coupling for the optical signals received through the pair of the apertures at the two end points P1 and P2 of the baseline on the equivalent pupil plane, wherein one of the optical signals passes through one of the two optical paths comprising an optical fiber retarder, controlling the optical fiber retarder by a computer to sweep optical path differences of the two optical paths such that a position of zero optical path difference of the two optical paths is included, performing DC removal and denoising on an interference curve of the interference fringes and obtaining an interference term, an envelope, and extreme values of the interference curve, obtaining the absolute phase φ of the complex coherence coefficient based on selection and comparison of the extreme values on the interference curve, wherein the absolute phase φ is the absolute phase of the complex coherence coefficient of any of the baselines on the equivalent pupil plane of the optical system, selecting a relative maximum light intensity value A in a first interval on the interference curve, wherein the first interval is located on one side of a main lobe of the zero optical path difference of the interference curve, and change in the relative maximum light intensity values in the first interval is stable, selecting two extreme light intensity values B and C that are closest to the relative maximum light intensity value A from a second interval, wherein the second interval is located on the other side of the main lobe of the zero optical path difference of the interference curve, change in the extreme light intensity values in the second interval is stable, and B>A≥C, and counting a number of fringe periods between A and C, and when the number of fringe periods is an even number, calculating and obtaining the absolute phase $$\phi = \frac{A-C}{B-C}\pi,$$

and when the number of fringe periods is an odd number, calculating and obtaining the absolute phase $$\phi = \left(1 + \frac{A-C}{B-C}\right)\pi.$$

2. A method for measuring an absolute phase of a complex coherence coefficient of an extended light source based on minimum light intensity values, comprising providing an optical system comprising an equivalent pupil plane with a plurality of baselines, wherein each of the baselines comprises a pair of apertures at two end points P1 and P2 on the equivalent pupil plane, emitting optical signals from the extended light source through optical paths to the equivalent pupil plane, wherein the optical signals pass through the pair of the apertures at the two end points P1 and P2 on the equivalent pupil plane, obtaining interference fringes through interference coupling for the optical signals received through the pair of the apertures at the two end points P1 and P2 of the baseline on the equivalent pupil plane, wherein one of the optical signals passes through one of the two optical paths comprising an optical fiber retarder, controlling the optical fiber retarder by a computer to sweep optical path differences of the two optical paths such that a position of zero optical path difference of the two optical paths is included, performing DC removal and denoising on an interference curve of the interference fringes and obtaining an interference term, an envelope, and extreme values of the interference curve, obtaining the absolute phase φ of the complex coherence coefficient based on selection and comparison of the extreme values on the interference curve, wherein the absolute phase φ is the absolute phase of the complex coherence coefficient of any of the baselines on the equivalent pupil plane of the optical system, selecting a relative minimum light intensity value A in a first interval, wherein the first interval is at one side of a main lobe of the zero optical path difference of the interference curve, and change in the relative minimum light intensity values in the first interval is stable, selecting two extreme light intensity values B and C that are closest to the relative minimum value A from a second interval, wherein the second interval is at the other side of the main lobe of the zero optical path difference of the interference curve, and change in the extreme light intensity values in the second interval is stable, and, where C>A≥B, and counting the number of fringe periods between A and C, and when the number of fringe periods is an odd number, calculating and obtaining the absolute phase $$\phi = \left| \frac{A-C}{B-C} \right| \pi,$$

and when the number of fringe periods is an even number, calculating and obtaining the absolute phase $$\phi = \left( 1 + \left| \frac{A-C}{B-C} \right| \right) \pi.$$

\* \* \* \* \*